Figure 1:
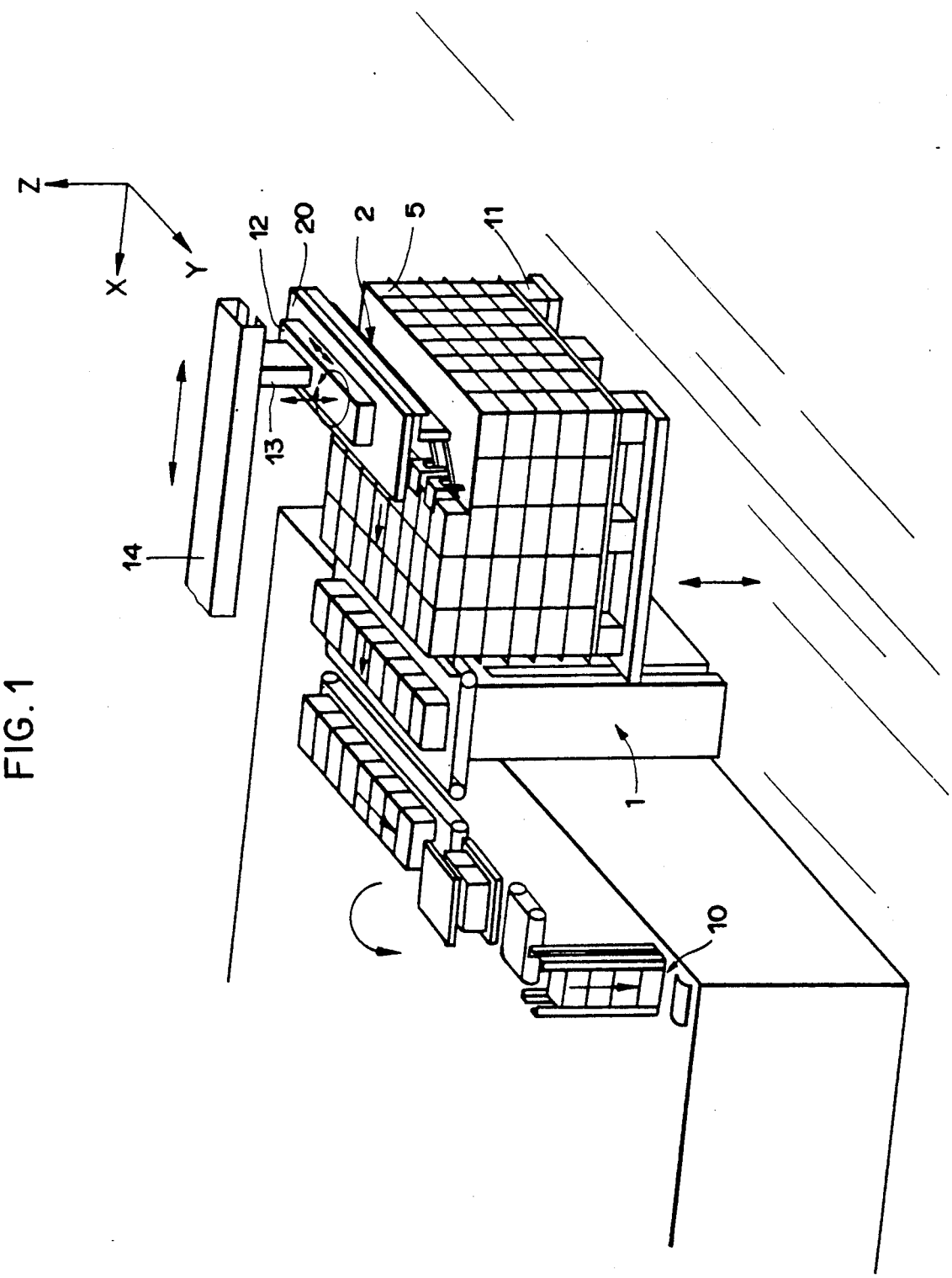

United States Patent [19]

Berger et al.

[11] Patent Number: 5,169,284
[45] Date of Patent: Dec. 8, 1992

[54] GRASPING AND TRANSFER CLAW

[75] Inventors: Maurice Berger, Cortaillod; Jean Cestonaro, Marin, both of Switzerland

[73] Assignee: Fabriques de Tabac Reunies, S.A., Neuchatel, Switzerland

[21] Appl. No.: 777,732

[22] Filed: Oct. 16, 1991

[30] Foreign Application Priority Data

Sep. 2, 1991 [EP] European Pat. Off. ........ 91810695.6

[51] Int. Cl.⁵ ............................................. B65G 59/02
[52] U.S. Cl. ................................. 414/796.9; 294/87.1; 414/792.6; 414/792.9; 414/929; 414/907
[58] Field of Search ............... 414/796.9, 792.9, 792.6, 414/929, 623, 751, 753, 907; 294/87.1, 907; 901/47

[56] References Cited

U.S. PATENT DOCUMENTS

| | | | |
|---|---|---|---|
| 4,383,788 | 5/1985 | Sylvander | 414/792.9 |
| 4,787,810 | 11/1988 | Cawley et al. | 414/591 |
| 4,993,915 | 2/1991 | Berger et al. | 414/796.9 |
| 5,087,169 | 2/1992 | Tubke | 414/796.9 |
| 5,102,293 | 4/1992 | Schneider | 414/796.9 |

*Primary Examiner*—H. Grant Skaggs
*Attorney, Agent, or Firm*—Jeffrey H. Ingerman

[57] ABSTRACT

The claw (2) is made up of a front part (3), moved vertically by a jack (31) and comprising a horizontal pressing plate (30) and a rear pressing plate (34), and a rear part (4) moved horizontally via another jack (46) and comprising a lower pressing plate (40) suspended by a pivot pin (42) from a stirrup-piece (41), a further jack (47 1) acting upon the rearward end (40A) of the lower pressing plate in order to raise and lower the front end (40B) thereof. When the rear pressing plate is lowered opposite a stack of blanks to be grasped, a slight depression (52) is created, whereby it is then possible to slip the front end of the lower pressing plate under the stack in order grasp it by raising the lower pressing plate and pressing the stack against the upper pressing plate. The claw is intended to be integrated in a depalletizer feeding a packing machine, particularly a machine making packs in the tobacco industry, especially packs of cigarettes. A plurality of such claws may be mounted side by side for grasping a whole row of stacks of blanks simultaneously. A sweeper device (36) mounted on each rear pressing plate allows the entire top layer of rows of stacks to be pushed back when the depalletizer detects that the row to be grasped is the first one of the layer, in order to form a ledge necessary for creating the aforementioned depression.

14 Claims, 8 Drawing Sheets

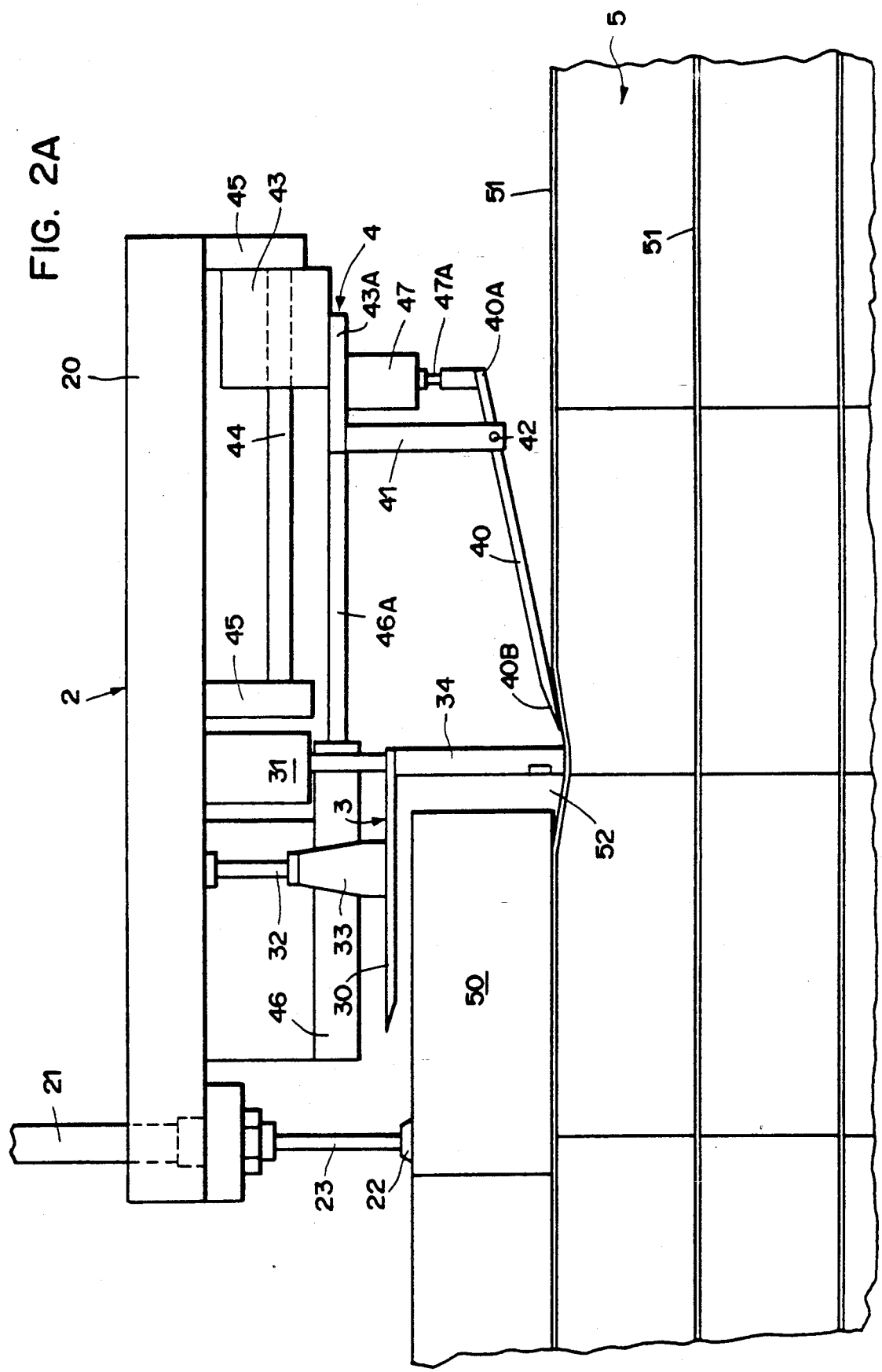

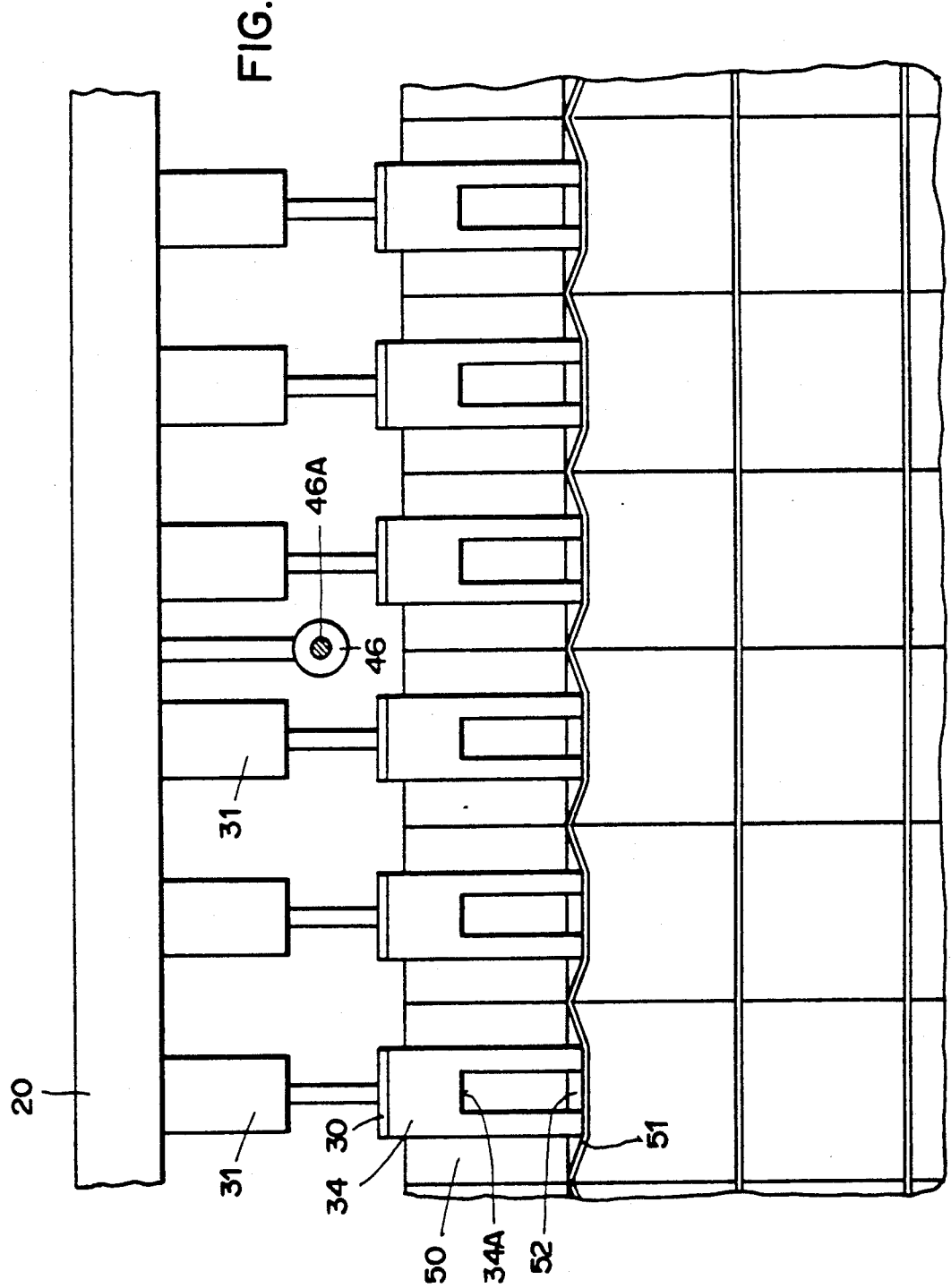

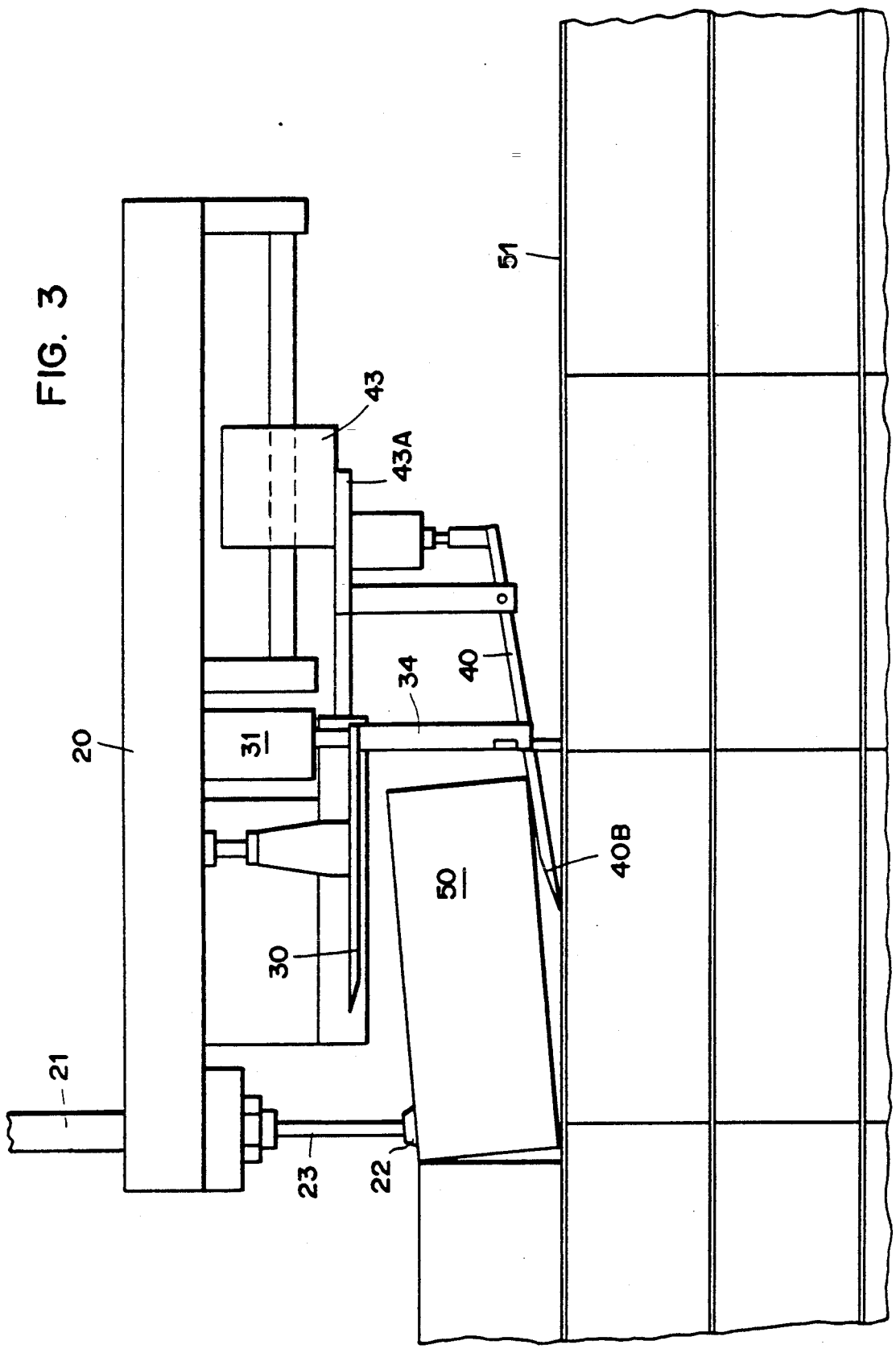

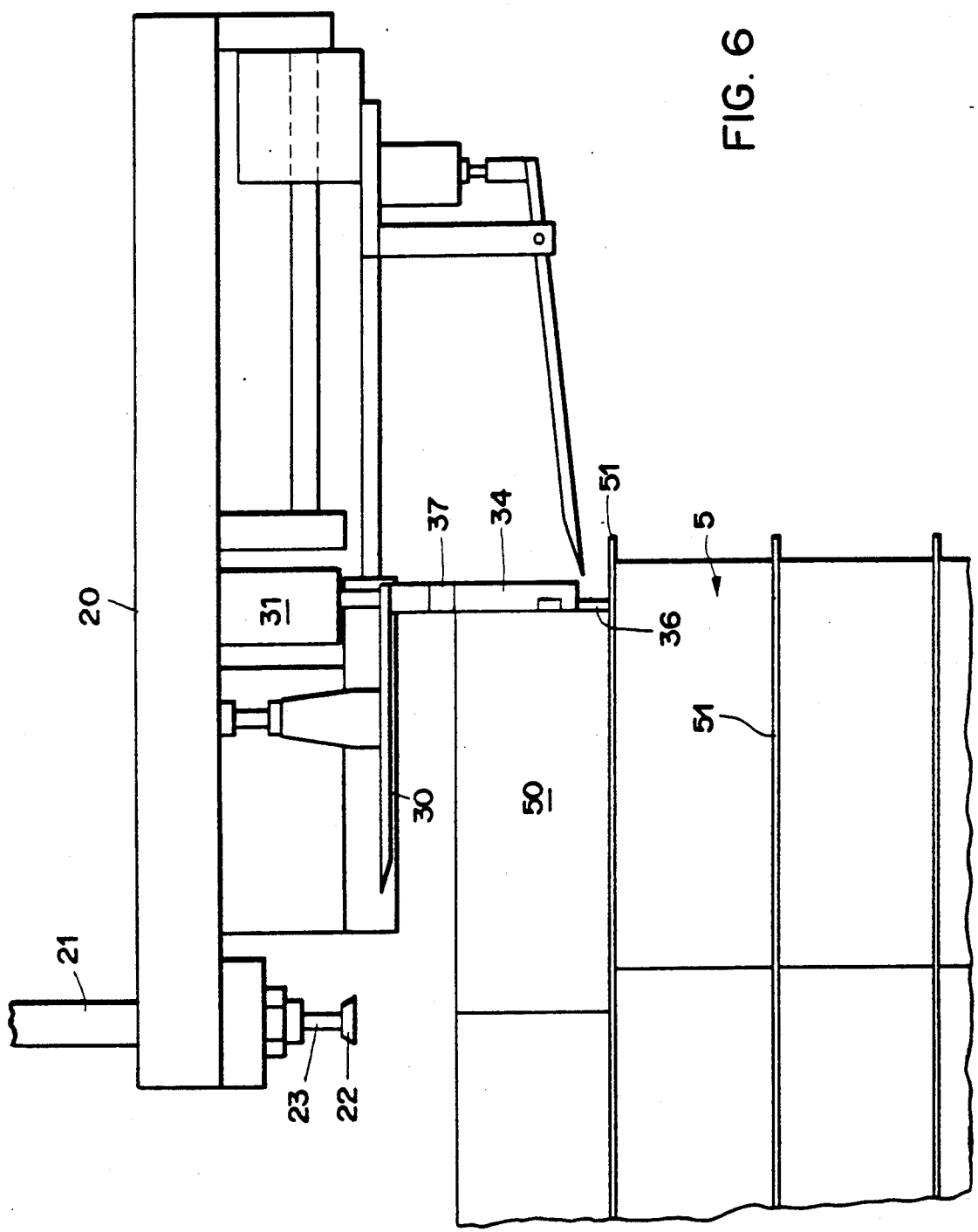

FIG. 7A
FIG. 7B
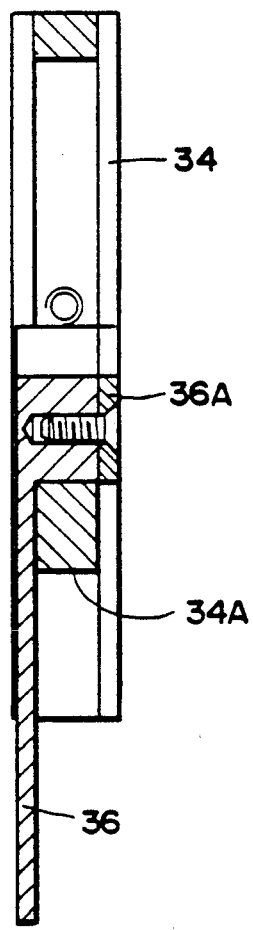
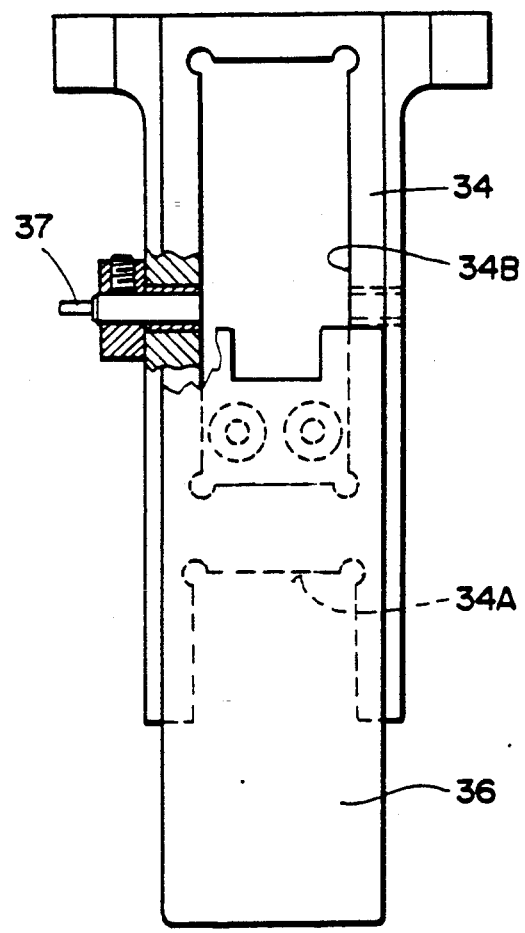

GRASPING AND TRANSFER CLAW

This invention relates to materials handling, and more particularly to a grasping and transfer claw intended to be mounted on a device for handling objects. The claw is designed to grasp automatically an object situated in one position and to transfer it to another position, where it is released; it is specially adapted for grasping and transferring objects presented in the form of a stack of individual flat objects, such as a stack of blanks or labels intended to feed a packing machine, for example. A plurality of claws according to the present invention, mounted side by side on a piece of materials handling equipment, are particularly suitable for simultaneously grasping a whole row of packets of labels disposed on a pallet and transferring this row of packets in a single operation, completely automatically, to a packing machine, especially but not limited to a machine for packing products of the tobacco industry, more particularly cigarettes.

A depalletizer for packets of blanks is described in detail in U.S. Pat. No. 4,993,915. This depalletizer comprises all the elements necessary for feeding a packing machine from a pallet loaded with stacks of blanks disposed in a number of layers of several rows each.

The present invention is a significant improvement of the claws forming part of the foregoing apparatus, permitting each stack of blanks to be grasped and transferred; for the prior art claw operates correctly only when the stacks of blanks are precisely arranged on the pallet and when the sheets of cardboard between the layers of stacks are precisely disposed as prescribed and are neither bent nor torn at their front edge. As this rarely happens when the apparatus is used industrially, it has been necessary to develop a new claw capable of adapting to this flawed situation.

It is therefore an object of this invention to provide an improved claw which can automatically and reliably grasp an object, more particularly a stack of blanks or labels, disposed on a pallet and transfer this object to, then release it on, the entry components of a packing machine.

It is also an object of this invention to provide a claw of which a plurality may be disposed side by side for grasping, transferring, and releasing an entire row of stacks of blanks or labels.

A further object of this invention is to provide such a claw which automatically operates completely reliably even if the arrangement of stacks in the row is not precise or if a cardboard separator sheet is not disposed correctly or is bent or torn at its front edge.

Still another object of this invention is to provide a claw which can be installed on a depalletizer for packets of blanks or labels.

To this end, the grasping and transfer claw according to the present invention comprises a first support element fixed to a mobile carriage of the handling device, a front claw portion and a rear claw portion being fixed to the first support element, the front claw portion including a horizontal upper pressing plate extending toward the object to be grasped, a vertical rear pressing plate fixed perpendicular to the rear portion of the horizontal upper pressing plate and extending toward the bottom of the object to be grasped, these horizontal upper and vertical rear pressing plates being movable along the vertical direction, being mounted on a first actuating device, the casing of which is fixed to the first support element, the rear claw portion including a guide rail oriented toward the object to be grasped, fixed to the first support element behind the first actuating device, a second support element sliding along the guide rail as acted upon by a second actuating device, the casing of which is fixed to the first support element, a lower pressing plate including a forward portion extending toward the object to be grasped and a rearward portion forming the continuation of the forward portion, the lower pressing plate being mounted on a horizontal pivot pin disposed between the forward and rearward portions, this horizontal pin being fixed to a stirrup disposed vertically and fixed to the second support element, the casing of a third actuating device being fixed to the second support element behind the stirrup, the third actuating device acting upon the rearward portion of the lower pressing plate in order to cause it to pivot about the horizontal pin and to assume a substantially horizontal position or a more inclined position.

Figure 4:
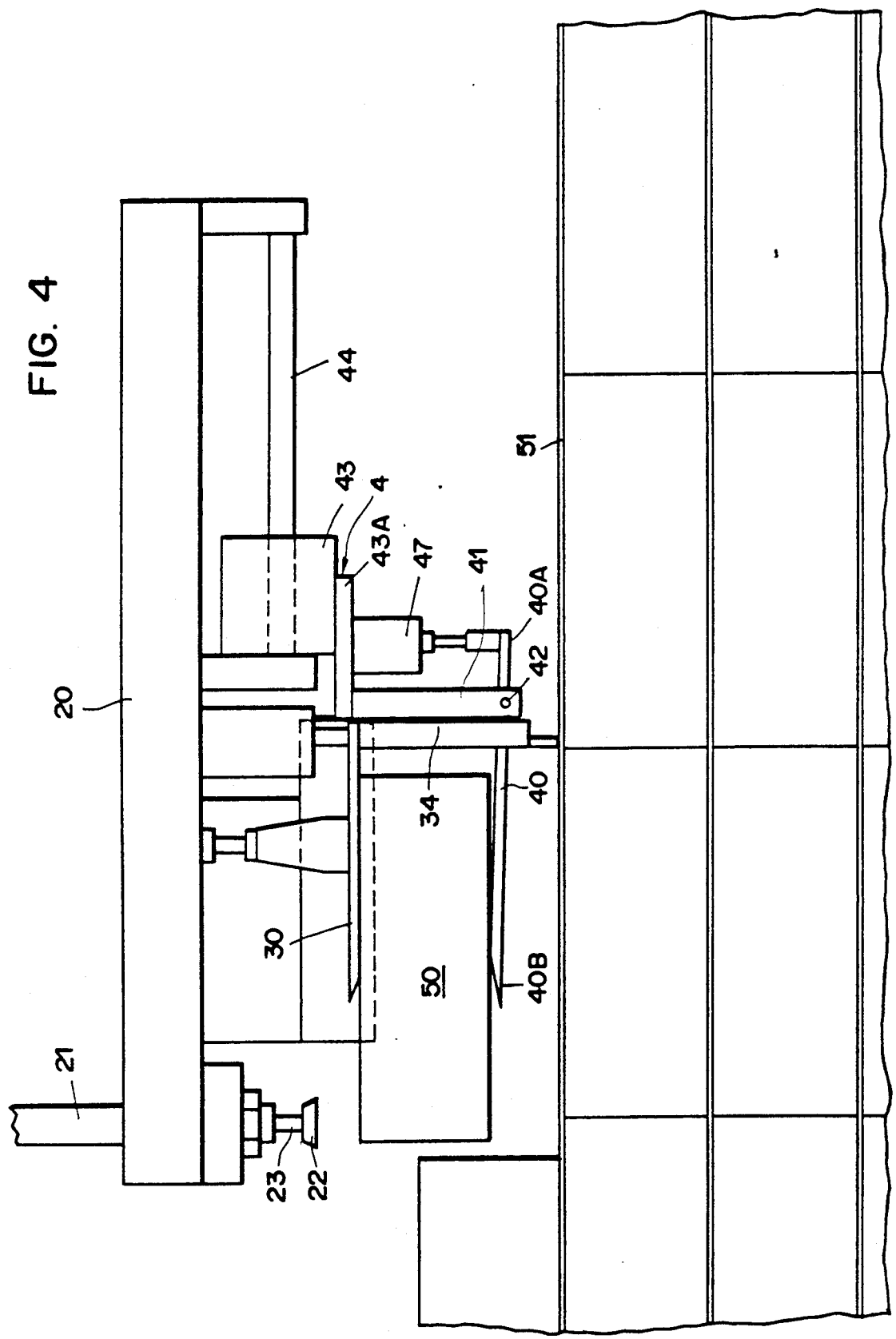
Figure 5:
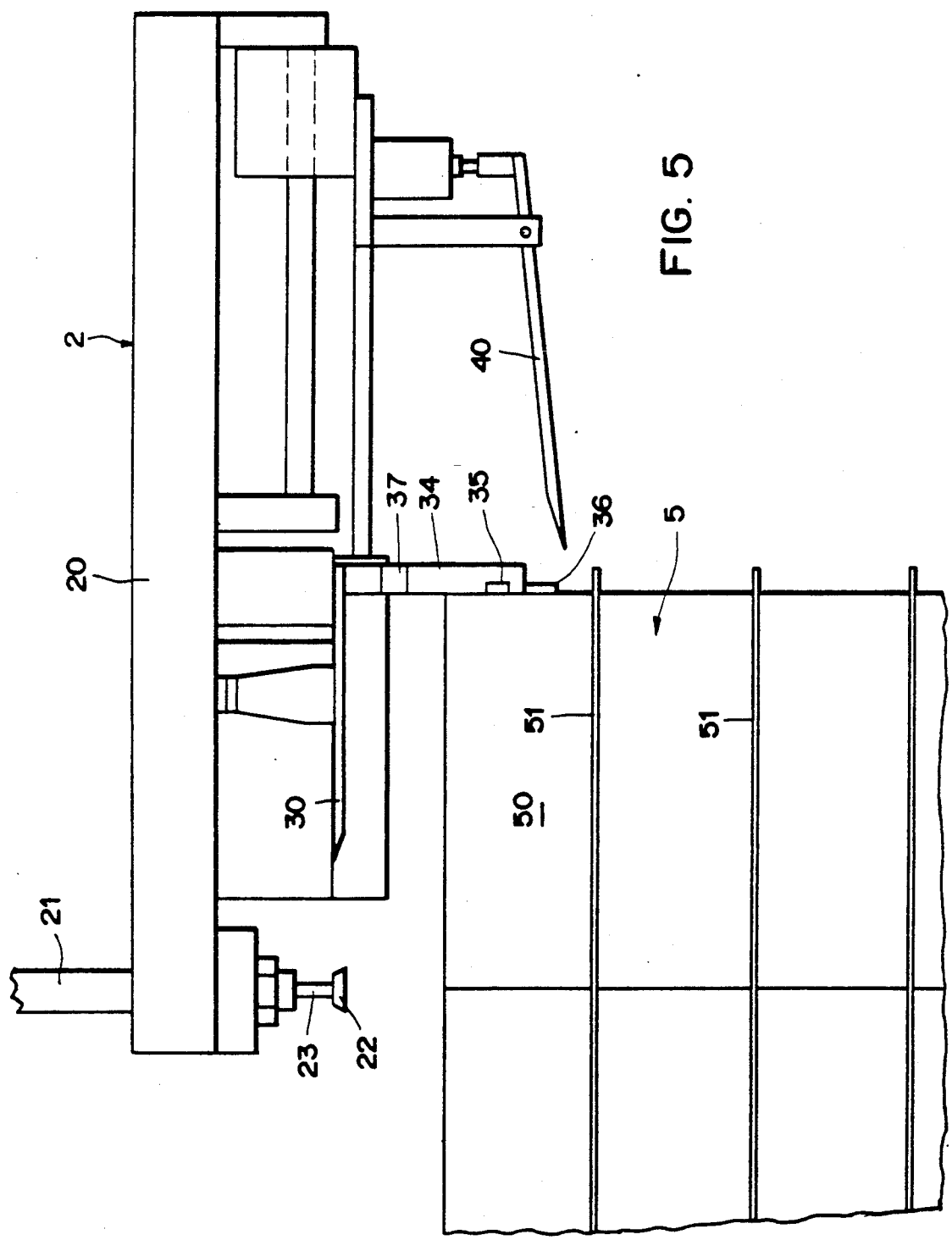

A preferred embodiment of the invention will now be described in detail with reference to the accompanying drawings, in which:

FIG. 1 is a simplified, diagrammatic perspective view of a depalletizer equipped with a set of claws according to the present invention, FIG. 2A is a side elevation on a larger scale of a claw in a preferred embodiment of the invention, ready to grasp a stack of blanks, FIG. 2B is a partial rear elevation showing the operation of the vertical rear pressing plates, FIG. 3 is a side elevation of a claw in the process of grasping a stack of blanks, FIG. 4 is a side elevation of a claw which has grasped a stack of blanks, FIG. 5 is a side elevation of a claw aligning itself with the first row of stacks of blanks, FIG. 6 is a side elevation of a claw after shifting of a layer of rows of stacks of blanks, and FIGS. 7A and 7B are side and front elevations, respectively, each partially in section, of a detail of a sweeper assembly on a rear pressing plate.

FIG. 1 is a diagrammatic view of a depalletizer 1 intended to feed a packing machine 10 from a pallet 11 loaded with stacks of blanks 5 disposed in a number of layers, each layer being formed of a number of rows of stacks of blanks. The general operation of depalletizer 1 and the various components of which it is made up are explained in detail in the aforementioned U.S. Pat. No. 4,993,915 and will therefore not be further described here.

The present invention relates to a claw unit 2 suspended from a support 20 which is in turn secured to a carriage 12 capable of moving along axes Y and Z, carriage 12 being secured to another carriage 13, capable of moving along axis X in a guide rail 14. Support 20 is secured to carriage 12 in such a way that it can pivot about vertical axis Z. These various modes of displacement are also described in the aforementioned patent.

FIG. 2A shows a preferred embodiment of a claw according to the invention, viewed from the side, as it prepares to grasp a stack of blanks 50. Claw unit 2 is composed of a front claw portion 3 and a rear claw portion 4, which are suspended from support 20.

Front claw portion 3 is composed of a horizontal upper pressing plate 30, preferably in the form of a thin metal plate slightly narrower than a stack of blanks and extending toward the stack 50 to be grasped. Upper pressing plate 30 can move vertically when acted upon by a drive which preferably consists of a double-acting pneumatic jack 31, the movement of plate 30 being guided by a guide rod 32 fixed perpendicular to support 20 and sliding in a guide 33. Secured to the back part of plate 30, perpendicular thereto, is a vertical rear pressing plate 34 extending downward.

Rear claw portion 4 is disposed behind vertical pressing plate 34; it comprises a lower pressing plate 40, preferably in the form of a thin, relatively narrow metal blade suspended from a stirrup-piece 41 and capable of pivoting about a horizontal axis in the form of a pin fixed to the bottom of stirrup-piece 41. The latter piece is in turn secured to a carriage 43 slidable in the direction of axis X along a guide rail 44 fixed horizontally under support 20 by means of braces 45.

Inasmuch as a plurality of claw units 2 are fixed side by side under support 20, each of the carriages 43 is connected to its neighbor by a driving plate 43A extending over the entire width of the plurality of claw units. Midway along the line of claw units 2, i.e., in the center of driving plate 43A, this plate is secured to a rod 46A of a drive, preferably in the form of a double-acting pneumatic jack 46, the body of which is fixed to support 20. Thus, by actuating jack 46, all the rear portions 4 of all the claws can be made to retract, as shown in FIG. 2A, or to advance, as shown in FIGS. 3 and 4. It will be understood that instead of a single jack 46, it is also possible to dispose a plurality of such jacks at regular intervals along the entire length of the line of claw units 2. Likewise, in a design comprising only a single claw, there might be two jacks 46 disposed on either side of jack 31 controlling the raising and lowering of upper pressing blade 30.

Another drive, also preferably in the form of a double-acting pneumatic jack 47, is fixed to carriage 43, acting via a rod 47A on the end of the rearward portion 40A of lower pressing plate 40 in order to be able to raise or lower the front end of the forward portion 40B of plate 40 by causing it to pivot about pin 42 secured to stirrup-piece 41.

A further double-acting pneumatic jack 21 is also fixed to support 20 at the front of claw unit 2. The end 22 of the piston rod 23 of jack 21 can come to rest upon the front part of the stack 50 to be grasped.

All the drives mentioned above are preferably constituted by double-acting pneumatic jacks; the same type of drive may also be carried out with other types of jacks, or some or all of these drives may be motorized.

The operation for preparing to have stack 50 grasped by claw unit 2 may also be seen in FIG. 2A. It will be noted first of all that the stack 50 to be grasped, or the row of stacks to be grasped, situated in the top layer of the pallet loaded with blanks 5, is slightly shifted toward the front with respect to the rows of stacks of the lower layers, this for a reason and in a manner to be described below. As customary, each layer of rows of stacks is separated from the following one by a cardboard separator sheet 51.

The position of support 20 relative to the pallet of blanks 5, i.e., to the row of stacks 50 to be grasped, has already been adjusted along axes X, Y, and Z by the means described in the U.S. patent initially mentioned. Although the following description refers to a single claw in operation, the other claws obviously act in the same manner on the stacks situated in the same row as the stack of blanks 50. The end 22 of piston rod 23 is aligned close to the front end of stack 50; it is lowered by the actuation of jack 21 so as to hold stack 50 firmly. At the same time, jack 31 is actuated to lower rear pressing plate 34 together with upper pressing plate 30, so that the bottom end of plate 34 presses strongly against cardboard separator sheet 51, as well as on the lower layers. In this way, a slight depression 52 is created by crushing of cardboard sheet 51 and by compression of the lower layers, just beneath the back of stack 50.

FIG. 2B is a view looking from just behind vertical rear pressing plates 34, the rest of claw unit 2 being omitted in order not to clutter the drawing, except for jack 46, the position of which in the center of the unit is indicated. Here it is seen that each rear pressing plate 34 comprises a notch 34A through which the front end 40B of lower pressing plate 40 can slide, the beginning of this movement being seen in FIG. 2A.

FIGS. 2A and 2B clearly show that owing to depression 52 and the space thus made available, front end 40B of plate 40 will be able to slip under stack 50 in order to grasp it. In these drawings, depression 52 has been slightly exaggerated in order to facilitate understanding of how the device operates.

A subsequent phase of this grasping operation is seen in FIG. 3, where carriage 43, together with the front end 40B of pressing plate 40, has advanced slightly under stack 50, causing it to pivot, through sliding of the rear bottom edge of stack 50 over the upper surface of pressing plate 40, about a fixed point situated in front of stack 50 and corresponding to the resting point of end 22 of piston rod 23 of jack 21. Rear pressing plate 34 and upper pressing plate 30 have been raised by actuation of jack 31 in order to leave enough room for the pivoting movement of stack 50.

FIG. 4 shows that stack 50 has been grasped completely. For this purpose, the end 22 of rod 23 of the piston of jack 21 has been raised all the way, whereas after carriage 43 has advanced as far as possible in direction X, causing front end 40B of lower pressing plate 40 to slip completely under stack 50, jack 47 has been actuated in order to lower the rearward end 40A of plate 40, i.e., to cause plate 40 to pivot about pin 42 so that the top surface of the front portion of plate 40 presses stack 50 against the underside of upper pressing plate 30. It will be noted that the pivoting of lower pressing plate 40 is such that it has passed the horizontal and presses stack 50 at a certain angle. Support 20 can now be raised along axis Z, to pass above the remaining rows of blanks, then be moved along axis X by the means described in the aforementioned U.S. patent, in order to transfer stack 50, i.e., the row of stacks, toward the conveyor means which carry these stacks to the packing machine. The release of stack 50 onto these conveyor means takes place by a slight loosening of the claw and retraction of carriage 43 with rear portion 4 of the claw.

It has been seen above that the success of the automatic grasping operation depends essentially on the possibility of creating depression 52 so that front end 40B of pressing plate 40 can slip under stack 50. It is generally difficult, or even impossible, to create this depression when the stack to be grasped forms part of the first row of stacks on the pallet. This situation is shown in FIG. 5. It is seen there that the pallet of blanks 5 is made up of a number of superimposed layers, each of these layers being separated from the next by a cardboard separator sheet 51. Since each cardboard sheet 51 protrudes slightly beyond the faces of the pallet, the edges of these sheets will most likely have been somewhat damaged by handling of the pallet of blanks 5, i.e., they will be torn or bent, thus preventing the creation of depression 52 and/or the sliding of lower pressing plate 40 under stack 50. Therefore, when the automatic control system of the depalletizer detects that the row to be grasped is the first in the layer, two additional operations, illustrated in FIGS. 5 and 6, are carried out.

It is seen in FIG. 5 that the pallet of blanks 5 has been raised so that its top layer is at a level to be seized by claw unit 2; during this operation, support 20 was completely retracted so as not to risk any collision between the top layer and rear pressing plate 34. Now support 20 is slowly moved along axis X until a contact feeler 35, preferably a proximity detector, of any one of the rear pressing plates 34 comes in contact with a stack 50. As a matter of fact, it is quite probable that the pallet will not be precisely centered relative to the machine; in order to eliminate this centering error, support 20 is then advanced very slowly so that the claws are aligned with respect to the pallet through the possible rotation of support 20 relative to carriage 12. This advancing-aligning movement is stopped when all the feelers 35 of pressing plates 34 have been actuated, i.e., have come in contact with the stacks of blanks opposite them. Support 20 is then adjusted in position along axis Y by means of feelers (not shown) so that each claw is exactly centered on the stack 50 it is to grasp.

Further to be noted in FIG. 5 is a sweeper 36 consisting of a plate which can slide freely facing rear pressing plate 34, and the position of which relative to plate 34 is measured by a sensor 37, which may be of any type known in the art. During the foregoing alignment operation, sweeper 36 hangs freely beneath plate 34, a space remaining between the bottom end of sweeper 36 and the cardboard separator sheet 51 situated under the top layer.

In FIG. 6, rear pressing plate 34 is seen to have been lowered by means of jack 31, so that sweeper 36 is in contact with and resting upon cardboard sheet 51; the order stopping the descent of plate 34 is given by sensor 37, detecting the position of sweeper 36. At that moment, since the entire claw assembly has been aligned as explained above, and since sweeper 36 is resting upon cardboard sheet 51, it is possible, by means of a movement of support 20 along axis X, to push the whole upper layer back by a suitable distance, e.g., 10-15 mm, in order to create a ledge wide enough to allow depressions 52 to be formed opposite the first row of stacks during the grasping operation described earlier. During the operations of alignment and of pushing back the top layer, the end 22 of rod 23 of pressing jack 21 and lower pressing plate 40 are both fully retracted.

FIGS. 7A and 7B show a partial side section and a front view, respectively, of rear pressing plate 34 and sweeper 36. The latter can slide freely along plate 34, being held against the front face of the latter by a tenon 36A sliding along a recess 34B in plate 34. Other designs of this particular device may obviously also be envisaged.

The inventive grasping and transfer claw, mounted on any materials handling apparatus, but particularly on a depalletizer of blanks, is therefore capable of grasping a stack or a row of stacks of blanks from any row of any layer of stacks of blanks disposed on a pallet and transferring it to the entry of a packing machine, completely automatically, being controlled by the control components and position detectors of the depalletizer. The inventive claw has been described as applied to the grasping and transfer of stacks of blanks or labels intended for the packing of products in the tobacco industry, particularly cigarettes; it will be understood, however, that it may just as well be applied to the grasping and transfer of any other object presented in a similar way, being used singly to grasp an individual object or in a line, as described here, for grasping a whole row of objects simultaneously.

What is claimed is:

1. A grasping and transfer claw intended to be mounted on materials handling apparatus having a mobile carriage, wherein the improvement comprises:
    a first support element fixed to the mobile carriage of the apparatus,
    a first actuating means having a casing fixed to said first support element,
    a front claw portion and a rear claw portion fixed to said first support element, said front claw portion including a horizontal upper pressing plate having a rear portion and extending toward an object to be grasped, and said rear claw portion including a guide rail oriented toward the object to be grasped and fixed to said first support element behind said first actuating means,
    a vertical rear pressing plate fixed perpendicular to said rear portion of said horizontal upper pressing plate and extending toward the bottom of the object to be grasped, said horizontal upper pressing plate and said vertical rear pressing plate being secured to said first actuating means for vertical movement,
    a second actuating means having a casing fixed to said first support element,
    a second support element slidingly movable along said guide rail of said rear claw portion by said second actuating means,
    a stirrup-piece disposed vertically and fixed to said second support element,
    a third actuating means having a casing fixed to said second support element behind said stirrup-piece,
    a horizontal pivot pin fixed to said stirrup-piece, and
    a lower pressing plate having a forward portion extending toward the object to be grasped and a rearward portion forming the continuation of said forward portion, said lower pressing plate being mounted on said pivot pin between said forward portion and said rearward portion, and said rearward portion of said lower pressing plate being pivotable about said pivot pin by said third actuating means for assuming a substantially horizontal position or an inclined position.

2. The claw of claim 1, wherein said second actuating means is adapted to cause said second support element comprising said lower pressing plate to assume a retracted position such that the front end of said forward portion of said lower pressing plate is behind said vertical rear pressing plate, and an advanced position such that said front end is situated beneath the object to be grasped.

3. The claw of claim 2, wherein said vertical rear pressing plate includes a downwardly directed aperture for accommodating said forward portion of said lower pressing plate.

4. The claw of claim 1, further comprising a fourth actuating means fixed to said first support element for holding and releasing, during operation of said claw, one end of the object to be grasped.

5. The claw of claim 1, wherein at least one said actuating means is a double-acting pneumatic jack.

6. The claw of claim 5, wherein each of said actuating means is a double-acting pneumatic jack.

7. The claw of claim 1, wherein the vertical distance between the underside of said horizontal upper pressing plate and the bottom of said vertical rear pressing plate is greater than the height of the object to be grasped.

8. The claw of claim 7, comprising means for causing the bottom of said vertical rear pressing plate to create a depression next to the underside of the object to be grasped for allowing the front end of said forward portion of said lower pressing plate to pass under the object to be grasped.

9. The claw of claim 8, wherein said vertical rear pressing plate includes slideways, further comprising a sweeper having a vertical plate slidingly mounted in said slideways and a position detector for monitoring the position of said sweeper relative to said vertical rear pressing plate.

10. The claw of claim 9, comprising means for allowing said vertical rear pressing plate and said sweeper to be lowered for pushing against said object to be grasped when said lower pressing plate is fully retracted.

11. The claw of claim 10, used for grasping and transferring a single object.

12. The claw of claim 10, disposed in a line comprising a plurality of said claws capable of grasping and transferring a row of objects simultaneously.

13. The claw of claim 12, wherein said materials handling apparatus is a depalletizer of blanks for packs of products in the tobacco industry.

14. The claw of claim 13 controlled automatically by control means of said depalletizer.

* * * * *